United States Patent [19]

Schnaibel et al.

[11] 4,143,706
[45] Mar. 13, 1979

[54] CLIMATE CONTROL FOR A MOTOR VEHICLE COMPARTMENT

[75] Inventors: Eberhard Schnaibel, Hemmingen; Erich Junginger, Stuttgart; Ernst Linder, Muhlacker; Wilhelm Hertfelder, Steinenbronn, all of Fed. Rep. of Germany

[73] Assignee: Robert Bosch GmbH, Stuttgart, Fed. Rep. of Germany

[21] Appl. No.: 820,497

[22] Filed: Jul. 29, 1977

[30] Foreign Application Priority Data

Jul. 29, 1976 [DE] Fed. Rep. of Germany ....... 2634015

[51] Int. Cl.$^2$ ........................ F25B 29/00; B60H 3/04
[52] U.S. Cl. ........................................ 165/26; 165/28; 165/43
[58] Field of Search ............ 165/26, 27, 28, 30, 165/39, 43; 236/91 F

[56] References Cited

U.S. PATENT DOCUMENTS

| | | | |
|---|---|---|---|
| 3,183,962 | 5/1965 | Sternhagen et al. | 165/30 |
| 3,183,964 | 5/1965 | Spivey | 165/43 |
| 3,590,910 | 7/1971 | Lorenz | 165/30 |
| 3,826,305 | 7/1974 | Fishman | 165/30 |
| 3,848,664 | 11/1974 | Perry et al. | 165/30 |
| 4,019,569 | 4/1977 | McMann | 165/27 |

Primary Examiner—William L. Freeh
Attorney, Agent, or Firm—Edwin E. Greigg

[57] ABSTRACT

A motor vehicle is equipped with a heater assembly in which hot coolant from the engine is circulated through a first heat exchanger, normally called heater. The vehicle is also equipped with a refrigerating unit, i.e., an air conditioner, which has a second heat exchanger, or cooler, located in front of or behind the heater. Two separate temperature sensors are provided. One of these senses the compartment temperature while the other is located directly adjacent to the heater and senses the temperature of the air leaving the heater. The responsivity of this latter sensor is made substantially lower than that of the compartment sensor, i.e., its signal change per unit temperature change is lower, resulting in differential weighting. A control unit is so constructed that when the compartment temperature rises, the heater, which is normally cycled on and off in a quasi-continuous fashion, is shut off. If the temperature rises further, the controller activates the refrigerator unit and the air is cooled. If, however, the temperature now drops below the set-point without having reached the shut-off point of the two-point air conditioner control, the heater unit is re-activated. The combination of continuous heater control and two-point cooler control insures stable compartment temperatures and rapid response.

14 Claims, 3 Drawing Figures

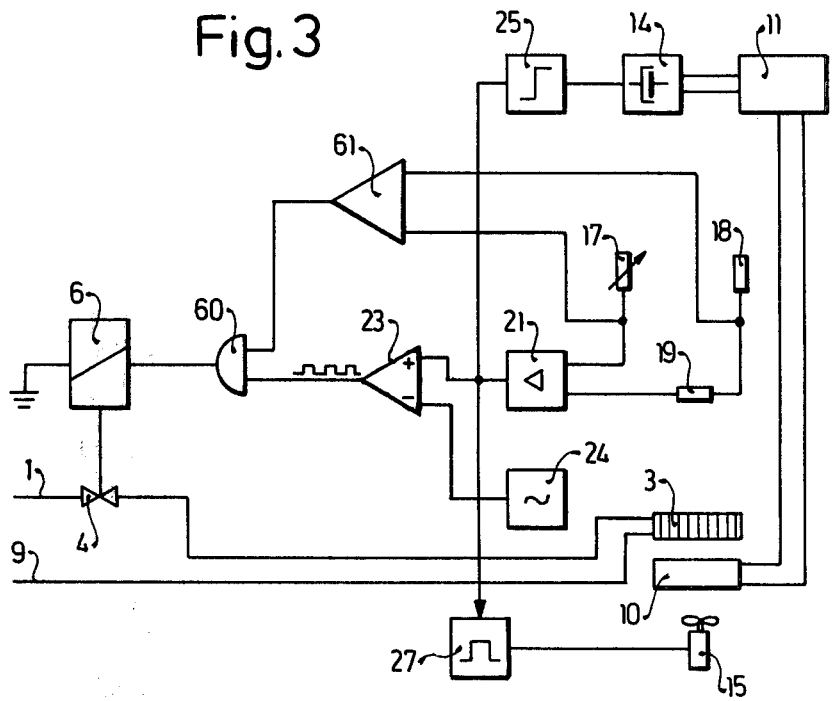

CLIMATE CONTROL FOR A MOTOR VEHICLE COMPARTMENT

BACKGROUND OF THE INVENTION

The invention relates to an apparatus for regulating the temperature in a room or a compartment. More particularly, the invention relates to controlling the temperature of the passenger compartment of a motor vehicle which is equipped with an air conditioning system that includes a heat exchanger for cooling and a second heat exchanger for the purpose of providing heated air. The supply line for the heating medium includes a final control element which is adjusted on the basis of information from a compartment temperature sensor which is compared with the reference or set-point temperature.

In a known system of this type, the air is accelerated by a blower and passes sequentially through a cooler and a heating radiator. The automatic control is confined to the adjustment of the heating power of the heating radiator.

In another apparatus of this type, the amount of air which passes through the heater or the cooler is adjusted by air flow directing elements on the basis of compartment temperature and external temperature while the quantity of the heating medium through the heater is also controlled by a valve.

An inherent disadvantage of the known apparatus is that the cooler assembly which delivers refrigerant into the cooling heat exchanger is in operation at all times and the desired air temperature must be adjusted with an additional and quite expensive control system for the heating plant that must have a large control domain. Furthermore, the straightforward temperature monitoring results in relatively wide control swings. In addition, the constantly operating refrigerating unit requires substantial energy which must be supplied by the engine. A second disadvantage in the known apparatus is that the various flaps and valves are subject to a high probability of failure and the rapidly and widely varying air flow rates through the heat exchangers do not permit a quick and exact temperature control because of the inherent hysteresis of changes of temperature.

OBJECT AND SUMMARY OF THE INVENTION

It is thus a principal object of the present invention to provide a control system for the temperature of the compartment of a motor vehicle in which the foregoing disadvantages are prevented. It is a further object of the invention to provide a temperature control system in which significant, different temperatures which affect the dynamics of the heating are separately sensed and compared with an adjustable reference or set-point value. It is yet another object of the invention to provide an apparatus in which even very small changes of the compartment temperature are rapidly corrected.

These and other objects are attained according to the invention by providing a temperature control system which includes a first heat exchanger for heating purposes and a second heat exchanger for cooling purposes. The invention further provides that the supply of heating medium to the heater is controlled by a cyclically actuated valve in a quasi-stationary manner while the cooler unit is turned either on or off completely. The control system receives the electric sum of signals from a compartment temperature sensor and a heating air temperature sensor. A significant aspect of the invention is that the sensitivity or weight of the compartment temperature sensor is substantially greater than that of the heating air temperature sensor. By employing a two-point control for cooling and by compensating the relatively coarse temperature variations produced thereby with a precise and sensitive control of the heating power, it is possible to run the overall system in a very economical manner.

It is a further and advantageous feature of the invention that the supply of heating medium to the heater is controlled by a very simple control element which itself switches continuously between an open and closed position at fixed frequency in normal operation. The very simple construction of this valve insures a rapid and reliable operation free from hysteresis. This type of valve control also dispenses with the additional expense for controlling apparatus which would be required if a valve were to be continuously adjusted in analog fashion.

The presence of the separate sensor for the heating air prevents wide swings of the heating power which would result from the inherent heat capacity of the heater unit. This fact is especially important when the compartment is being heated. A relatively lower weighting of the heating air sensor insures that the heating power is shut off only when the compartment temperature actually approaches the reference or set-point value. Once the control loop is in steady state, i.e., when the compartment temperature has reached the set-point value, the control system responds quickly to any change of temperature by sensing the air temperature at the outlet of the heater.

A favorable embodiment of the invention provides that the response time of the heating air temperature sensor is smaller than the period of actuation pulses for the heating medium valve. As a result, the sensitivity or weight of the sensor, i.e., the coefficient of signal change for each units change of temperature in the heating air sensor can be much smaller because any temperature change becomes effective very rapidly.

The invention also includes a voltage-controlled pulse generator which actuates a blower associated with the cooling unit. In this manner, the air flow rate may be adjusted continuously to account for very large power requirements due to ambient conditions.

The invention will be better understood as well as further objects and advantages thereof become more apparent from the ensuing detailed description of two examplary embodiments taken in conjunction with the drawing.

BRIEF DESCRIPTION OF THE DRAWING

FIG. 3 is a schematic diagram of a second embodiment of the invention.

DESCRIPTION OF THE PREFERRED EMBODIMENTS

Figure 1:
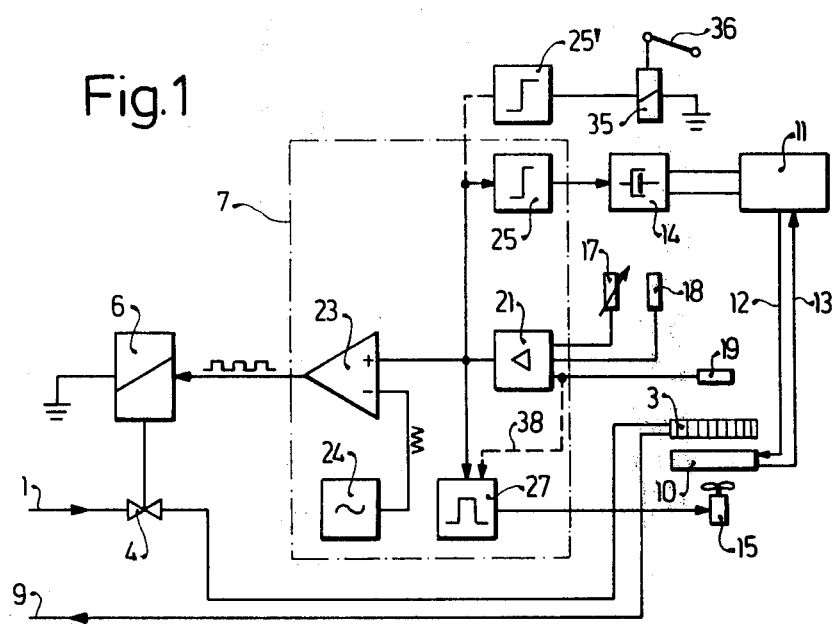
FIG. 1 is a schematic diagram of a first exemplary embodiment of the invention including several variants.

The first exemplary embodiment of the invention illustrated in FIG. 1 includes a supply line for a heating medium derived from the cooling system of a motor vehicle engine (not shown) and leading to a heat exchanger 3 for providing heated air. The heating medium passes through a control element 4, i.e., a valve, which adjusts the flow rate of the heating medium to the heater 3. Preferably, the control element 4 is a solenoid valve which is actuated by magnetic windings 6 from a controller 7. A return line 9 leads from the heat exchanger 3 back to the cooling system of the engine.

The apparatus further includes a second heat exchanger 10 which serves to provide refrigerated air to the compartment. The heat exchanger 10 is the condensing unit of a refrigerating system 11 to which it is connected via conduits 12 and 13. In known manner, the compressor of the refrigerating system 11 is driven by the engine and coupled thereto by a magnetic clutch 14 which may be actuated by the controller 7. A blower 15, also controlled by the controller 7, provides an additional air flow through the two heat exchangers.

The controller 7 includes a set-point generator 17 which may be variable potentiometer, as well as a compartment temperature sensor 18 and a heating air sensor 19. Preferably, the two sensors are connected in series but their signals may also be added together and fed to a differential amplifier 21, as shown, which has its non-inverting input connected to the set-point generator 17. The output of the differential amplifier 21 is fed to a first input of a comparator 23 whose second input receives a signal from a signal generator 24 which generates a triangular voltage at fixed frequency. The output of the comparator 23 is fed to the actuating winding 6 of the valve 4.

The output of the differential amplifier 21 is further connected with a threshold switch 25 which actuates the magnetic clutch 14. The output of the differential amplifier 21 is still further connected to the input of a voltage-controlled pulse generator 27 which generates pulses of fixed frequency but variable pulse width as a function of the output voltage of the amplifier 21 and these pulses are used to control the blower 15.

Figure 2:
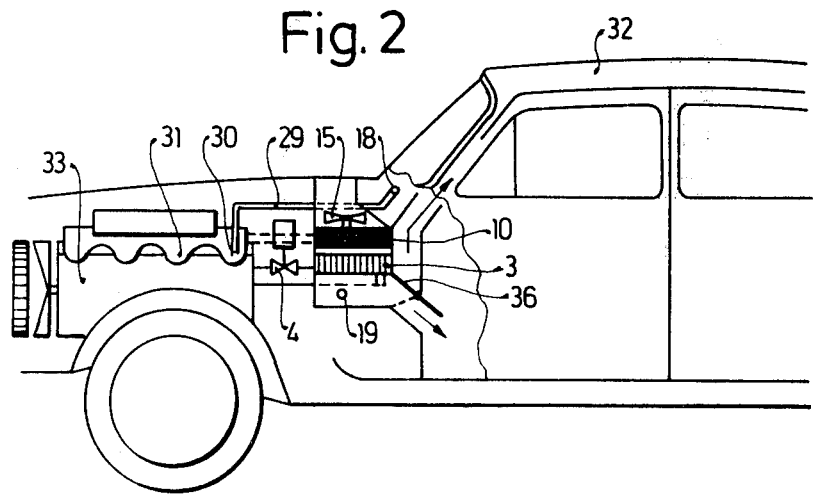
FIG. 2 is a schematic illustration of a favorable disposition of temperature sensors.

Preferred locations for the two temperature sensors 18 and 19 are illustrated in FIG. 2. It has been found that the measuring precision of these sensors is very highly dependent on their position. For example, the heating temperature sensor 19 provides the most useful signals if it is located at the point of the greatest air flow rate at the output of the heater and preferably in the vicinity of the inlet for the heating medium. The location of the compartment temperature sensor is also extremely important. Its purpose is to sense the temperature to which the passenger is actually exposed. It is further desired that the temperature sensor should quickly respond to any changes in the compartment temperature, for example when a window or door is opened.

Accumulated heat from heat sources within the vehicle or due to irradiation from the outside may also result in large falsifications. For this reason, the compartment temperature sensor 18 is located where it is protected from direct solar radiation. In a preferred embodiment, the compartment temperature sensor is located at the terminus of a tube 29, the other end of which is connected through a throttle 30 with the induction tube 31 of the internal combustion engine 33 mounted in the vehicle 32. In this construction, the engine acts as an air transporter which continuously aspirates air from the compartment of the vehicle 32 through the tube 29 and thus delivers air to the sensor which is representative of the air to which the passengers are exposed.

The operation of the control system so far described is as follows. The controlled variable derived from the combined signals of the compartment temperature sensor 18 and the heating temperature sensor 19 is compared with the value generated by the set-point generator 17 and results in a proportional output voltage at the differential amplifier 21 which is then fed to the comparator 23. The differential amplifier 21 operates as a proportional controller. The comparator 23 combines the triangular voltage from the generator 24 which the signal from the amplifier 21 and produces a rectangular pulse train of the same frequency as the triangular voltage but with a variable pulse width which depends on the amplitude of the output voltage from the amplifier 21. This pulse train energizes the magnetic windings 6 and thus actuates the valve 4 which alternates between the open and closed positions. The relative periods of time in which the valve is open depend on the degree of the control deviation. In this way, the heater receives a precisely metered amount of heating medium. The amplitude limits of the triangular voltage define a roughly proportional control domain. If the output voltage of the differential amplifier 21 exceeds or falls below the maximum amplitudes of the triangular voltage, the pulses at the output of the comparator 23 cease and only a maximum or minimum saturation value is present. For example, if the sum of signals from the sensors 18 and 19 is below the set-point value 17 and if the output voltage from the differential amplifier 21 is within the triangular voltage limits, then the valve 4 is completely open. In the opposite extreme case, this valve will be fully closed.

In order to compensate for the non-linearity of the heater characteristics, it is advantageous if the edges of the triangular voltage are actually parts of an exponential curve in which a steep increase of voltage is followed by a gradually shallower voltage decrease on the other side of the triangle. If the control deviation is large, then voltage changes at the output of the differential amplifier 21 result in only small changes of the overlap of this voltage with the triangular voltage whereas, if the control deviation is small, the same voltage changes result in considerably larger changes of the overlap. Therefore, in the upper control domain, the changes in the pulse width are relatively small and they are relatively large in the lower control region.

The above-described system provides a quasi-continuous control of the heating which prevents an excessive fluctuation of the compartment temperature such as may be present in two-point control and due to an unfavorable dimensioning of the heat exchanger. Furthermore, a substantial investment in control hardware which would be required for a continuous, analog adjustment of the opening cross section of the valve 4 is avoided. The valve 4 may be a simple and reliable switching valve which is either fully closed or fully open. Such a valve requires substantially less power for operation and the control process is more exact and more rapid than in continuous adjustments which also entail substantial hysteresis effects. The valve is also more useful for very rapid heating of the compartment from a cold condition.

When the output voltage of the differential amplifier exceeds the maximum amplitude of the triangular voltage, the magnetic valve 4 remains closed and the heater 3 is shut off. If the external temperature is elevated and the compartment temperature rises further, the air must be artificially cooled. For this purpose, the threshold switch 25 is adjusted to a voltage lying just at or above the maximum triangular voltage. As soon as the output voltage from the differential amplifier reaches this level, the refrigerating system 11 is coupled in by the magnetic clutch 14 and the cooler unit 10 receives refrigerant. The threshold switch 25 has inherent hysteresis so that it is turned off only at a second, and lower, temperature than the temperature at which it was actuated. The threshold switch 25 thus represents a two-point controller for the cooling system. The built-in hysteresis of the threshold switch, as well as the inherent hysteresis of the cooling system, would result in pronounced fluctuations of the compartment temperature if the heating system were not also controlled at the same time. Recognizing this fact, the invention provides that when the output voltage of the differential amplifier 21 re-enters the amplitude domain of the triangular voltage, i.e., it re-enters the proportional control domain, then the air passing through the heating unit 3 is provided with additional heat proportional to this voltage and thereby prevents pronounced temperature swings. The basic lack of precision of the two-point control of the cooling unit is thus compensated by a very precisely controlled additional heating performed by the heater unit.

One factor responsible for the precision of the control system of the invention is the different sensitivity or weight of the temperature sensors 18 and 19. To take account of the fact that the compartment temperature changes relatively slowly compared to the temperature in the immediate vicinity of the heater, the compartment temperature sensor 18 generates a substantially higher control signal than does the heating air sensor 19. The ratio of the weights of these two signals may be 1:8, for example. The sum of the two control signals is then fed to the differential amplifier 21. The differential weight of the signals from these sensors is essential for the stability of the control loop. If the heating temperature sensor 19 has a very low weight or is left out altogether, then only the compartment temperature sensor 18 is effective which leads to unstable control behavior and to very large periodic deviations from the set-point value. On the other hand, if the heating air temperature sensor is weighted too highly, the static control deviation becomes unduly high, for example if cold external temperatures require high temperatures in the vicinity of the heater 3, for, in that case, the addition of the two control signals would result in a relative effective diminution of the actual compartment temperature because the signal related to that temperature would have a decreasing effect on account of the relatively increasing signal from the heating air temperature sensor 19 which responds to the very high heating power required under these conditions. For this reason, it is advantageous to hold the weight of the heating air temperature sensor as low as possible. The precision of the compartment temperature controller is also enhanced by a very low inertia of the sensor 18 which is ventilated in the manner described above.

The temperature sensors may be, for example, silicon diodes whose different effect is realized by embodying the compartment temperature sensor as an integrated triple diode and the heating air temperature as a simple diode. Other suitable temperature-sensitive elements may also be employed.

The precision of the control system requires that the response time of the heating air sensor 19 be very short so as to permit it to be fully effective. In particular, the response time of this sensor 19 must be smaller than the period of actuation of the switching valve 4 so that any change will begin to be corrected by a change in the next following pulse. On the other hand, the frequency of valve actuation must be larger than the inherent frequency of the heater so that changes in the flow of heating medium do not result in oscillations of the flow rate.

When the external air temperatures are high and the vehicle speed is low, the static pressure at the air inlet of the vehicle may be insufficient to deliver the required air flow rate through the cooling unit 10. In that case, a supplementary embodiment of the invention provides a blower 15 running at variable speed. The speed of the blower 15 is controlled by the pulse generator 27 which receives the output voltage from the differential amplifier 21 and adjusts the pulse width of its output pulse train according to the control deviation of the signals at the input of the amplifier 21. In this manner, the rpm of the blower can be continually increased up to a maximum rpm which is obtained when the pulse generator provides a constant saturation voltage. This voltage may also be superimposed on a basic supply voltage for the blower 15. In that case, the blower 15 operates at a minimum rpm even when the pulse generator 27 supplies no additional voltage. The basic blower speed can serve to overcome flow resistances in the air conduits.

It may be advantageous to provide secondary or further threshold switches such as threshold switch 25' for operating control solenoids 35 or servo motors which in turn actuate air valves 36 in the air ducts. These air valves may be such as to limit or completely shut off the flow of outside air to the interior of the vehicle. Such a shut-off may be favorable when the outside temperatures are very high or very low and permits keeping the power of the heating unit, and especially that of the cooling unit, as low as possible. The system may also include air valves which control the outlet of the heated or cooled air so as to add to the comfort of the heating system and permit a desired distribution of temperature in the compartment.

A particularly advantageous embodiment of the switching valve 4 is that of a pneumatically actuated valve. Such a known valve includes an electromagnet which switches the communication of a pressure cell from a source of vacuum to the ambient air and vice versa. A diaphragm reacts to these pressure changes and opens and closes the valve. Such a pneumatic valve permits hysteresis-free cyclic actuation and virtually frictionless functioning.

A further variant of the embodiment illustrated in FIG. 1 provides that the input of the voltage controlled pulse generator 27 is connected to the heating air temperature sensor 19 by a line 38 which is shown dashed. In this way the electric blower 15 is controlled on the basis of the control deviation, i.e., the output of the amplifier 21, as well as on the basis of the signal from the sensor 19. Actually, this manner of connection eliminates the effect of the sensor 19. In this way, when the control deviation is large, the speed of the blower 15 follows changes of the compartment temperature more quickly and results in a more rapid compensation of the temperature difference.

A second exemplary embodiment of the invention is illustrated in FIG. 3 in which elements identical to FIG. 1 have retained the same reference numerals. Departing from the structure of FIG. 1, there is provided in this embodiment of FIG. 3 a logical circuit shown as an AND gate 60 connected between the comparator 23 and the solenoid 6 of the switching valve 4. A power amplifier may be inserted between the gate 60 and the valve. The second input of the AND gate is connected to the output of a threshold switch 61 which may be embodied as an operational amplifier one of whose inputs is connected to the set-point generator 17 while the other input is coupled to the compartment temperature sensor 18. The additional elements permit an actuation of the magnetic winding 6 of the valve 4 in the sense of valve closure only if the output signal of the comparator 23 and the output of the threshold switch 61 are identical. This will be the case if the compartment temperature is close to the preset set-point value and lies, for example, within the proportional domain of the controller, i.e., the output voltage of the differential amplifier 21 lies in the region of the triangular voltage. The threshold switch 61 compares the signal from the compartment temperature sensor 18 which in this embodiment is connected in series with the temperature sensor 19 with the signal from the set-point generator 17. As long as the compartment temperature is below this reference temperature the valve 4 is always open. Once the threshold value is exceeded, the full output signal of the comparator 23 is applied to the switching valve.

This embodiment insures that, when the compartment is still cold, the entire heating power of the heating unit 3 may be used for heating the compartment unaffected by any control influence, thereby resulting in a very rapid heating.

The temperature control system according to the present invention provides the substantial advantage over known apparatus of this type that a relatively inexpensive mechanism provides very precise and reliable control of the vehicle compartment. An additional advantage of the apparatus of the invention is that when outside temperatures are very high, a highly precise control may be achieved with energy savings even though a simple two-point cooling system control is used.

The foregoing relates to merely preferred exemplary embodiments of the invention, it being understood that other embodiments and variants thereof are possible within the spirit and scope of the invention.

What is claimed and desired to be secured by letters patent of the United States is:

1. An apparatus for controlling the temperature of a motor vehicle compartment, comprising, in combination:
   a source of heated fluid;
   a first heat exchanger, connected to said source of heated fluid and provided with flow control means to regulate the flow of heated fluid in said first heat exchanger; for heating air passing therethrough;
   refrigerator means, including a second heat exchanger for cooling air passing therethrough, said second heat exchanger being disposed in the stream of air passing through said first heat exchanger;
   a set-point generator for generating a set-point signal related to a desired compartment temperature;
   first temperature sensor means, disposed in said compartment for sensing the compartment temperature;
   second temperature sensor means, disposed near the air outlet of said first heat exchanger, for sensing the temperature of the heated air leaving said first heat exchanger, the coefficient of signal change per unit temperature change of said first temperature sensor being substantially greater than the same-defined coefficient of said second temperature sensor; and
   control means for summing the signals from said first and second temperature sensor and for comparing them to said set-point signal to thereby cyclically control the operation of said flow control means and to selectively actuate said refrigerator means.

2. An apparatus as defined by claim 1, wherein said second temperature sensor means has a response time substantially smaller than the response time of said first temperature sensor means.

3. An apparatus as defined by claim 1, wherein said flow control means is an on-off valve disposed in the conduit between said source of heated fluid and said first heat exchanger, and said flow control means further includes an actuator mechanism and wherein said control means generates pulses of fixed frequency and variable pulse width for controlling said actuator mechanism.

4. An apparatus as defined by claim 3, wherein the response time of said second temperature sensor means to a change in temperature is lower than the period of said pulses.

5. An apparatus as defined by claim 1, wherein said first temperature sensor means is disposed at the terminus of a tube and wherein said apparatus includes an air transport device for transporting air from said vehicle compartment through said tube.

6. An apparatus as defined by claim 5, wherein said tube is connected to the induction tube of the engine of said motor vehicle.

7. An apparatus as defined by claim 1, further comprising a threshold switch connected to receive the signal from said first and from said second temperature sensor means and for providing an output signal for continuous actuation of said flow control means when a threshold is exceeded.

8. An apparatus as defined by claim 7, further comprising a logical gate the output of which actuates said flow control means and one of whose inputs is connected to the output of said threshold switch while the other input of said logical gate is connected to the output of said control means.

9. An apparatus as defined by claim 1, wherein said control means includes a differential amplifier for receiving the signals from said first and second temperature sensor means and for comparing their sum to said set-point signal and for providing an output related to the results of said comparison and further includes a comparator for receiving at one input the output from said differential amplifier and further includes a voltage generator for generating a triangular voltage of fixed frequency which is connected to the second input of said comparator; whereby said comparator delivers to said actuator means rectangular pulses the width of which corresponds to the magnitude of the output signal from said differential amplifier.

10. An apparatus as defined by claim 9, further comprising at least one threshold switch driven by the output of said differential amplifier for controlling a supplementary system.

11. An apparatus as defined by claim 10, wherein said supplementary system selectively actuates said refrigerator means.

12. An apparatus as defined by claim 10, wherein said supplementary system is an air flow control mechanism for directing the flow of air through said apparatus.

13. An apparatus as defined by claim 10, further comprising blower means for accelerating the air flow through said apparatus and voltage-controlled pulse generator means controlled by the output of said differential amplifier for driving said blower means.

14. An apparatus as defined by claim 13, wherein the input of said pulse generator means is connected to receive the signal from said second temperature sensor means.

* * * * *